(12) United States Patent
Horres

(10) Patent No.: US 6,620,277 B1
(45) Date of Patent: Sep. 16, 2003

(54) METHOD FOR THE PRODUCTION OF BINDER-BOUND MINERAL WOOL PRODUCTS, APPARATUS FOR CARRYING IT OUT, MINERAL WOOL PRODUCT THEREBY PRODUCED, COMPOSITE MINERAL PRODUCT THEREBY PRODUCED AND USE OF THESE PRODUCTS

(75) Inventor: Johannes Horres, Ladenburg (DE)

(73) Assignee: Saint-Gobain Isover, Courbevoie (FR)

( * ) Notice: Subject to any disclaimer, the term of this patent is extended or adjusted under 35 U.S.C. 154(b) by 0 days.

(21) Appl. No.: 09/868,684

(22) PCT Filed: Dec. 23, 1999

(86) PCT No.: PCT/EP99/10376
§ 371 (c)(1),
(2), (4) Date: Jun. 20, 2001

(87) PCT Pub. No.: WO00/39381
PCT Pub. Date: Jul. 6, 2000

(30) Foreign Application Priority Data

Dec. 23, 1998 (DE) .......................................... 198 60 040

(51) Int. Cl.$^7$ ................................................ D04H 1/70

(52) U.S. Cl. ...................... 156/177; 156/181; 156/183; 156/196; 156/582; 264/282; 425/83.1

(58) Field of Search ................................ 156/62.2, 177, 156/180, 181, 183, 200, 196, 582; 264/109, 282; 425/83.1

(56) References Cited

U.S. PATENT DOCUMENTS 4,567,078 A    1/1986    Blackmore et al.

FOREIGN PATENT DOCUMENTS

| DE | 3741045 | 12/1988 |
| DE | 19860040 | 6/2000 |
| WO | 91/14816 | 10/1991 |

*Primary Examiner*—Sam Chuan Yao
(74) *Attorney, Agent, or Firm*—Nath & Associates PLLC; Gary M. Nath; Jerald L. Meyer

(57) ABSTRACT

Method for the production of binder-bound mineral wool products, in which mineral fibers are deposited on a production surface (13) to form a mineral wool web (12) and are compacted, and their relative positions are reoriented by mechanical action, for which purpose the web is guided on its large faces and at the same time forces, in particular upsetting forces, are introduced into the web in parallel with the large faces, the forces being introduced in introduction regions which are located next to one another transversely to the running direction in zones and in each case at a distance from one another and one behind the other in the running direction in longitudinal zones, and the introduction regions of adjacent longitudinal zones being arranged so as to be offset relative to one another, after which the binder is cured. The introduction regions are designed to be elongated in the running direction (14) of the mineral wool web (12), and the introduction regions of longitudinal zones located next to one another form overlap regions (27; 127). As a result, such high longitudinal forces can be introduced into the web that the material of the mineral wool web is exposed to a fulling action in the web plane.

2 Claims, 3 Drawing Sheets

Figure 1:
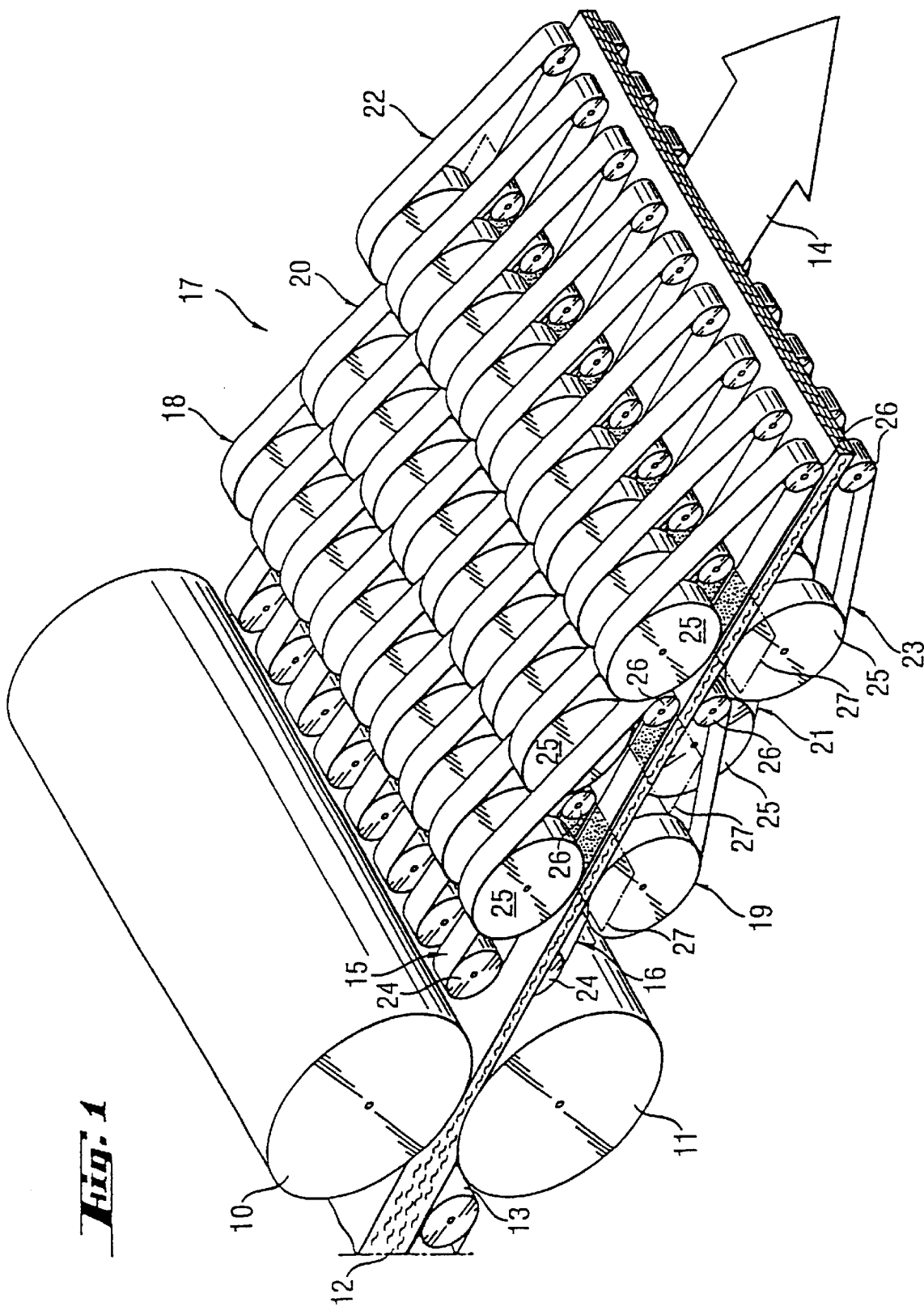

METHOD FOR THE PRODUCTION OF BINDER-BOUND MINERAL WOOL PRODUCTS, APPARATUS FOR CARRYING IT OUT, MINERAL WOOL PRODUCT THEREBY PRODUCED, COMPOSITE MINERAL PRODUCT THEREBY PRODUCED AND USE OF THESE PRODUCTS

The invention relates to a method and an apparatus for the production of binder-bound mineral wool products.

In order to produce upsetting, that is to say longitudinally compressed mineral wool products having an increased fraction of mineral fibres oriented in the direction of thickness of the web, it is customary by mechanical action to reorientate the relative positions of the mineral fibres of a mineral wool web deposited on a production surface, for which purpose the web is guided on its large faces and at the same time upsetting forces are introduced into the web in parallel with the large faces. As compared with the production of lamellar mats or lamellar boards from cut-off lamellae rotated through 90°, this affords the advantage of the efficient continuous production of mineral wool products with high strength against pressure exerted under large faces of the product.

The introduction of compressive forces into the still uncured mineral fibre web often leads to a reorientation of interconnecting fibre regions with the effect of the formation of creases in the product. Although this is not harmful in terms of pressure resistance, it results in low flexural resistance of a board of this type, since even low tensile forces at the surface cause adjacent creases to gape open. Moreover, the acoustic and thermal insulating properties of such a board decrease considerably in its direction of thickness through the fibre zones lying in the direction of thickness.

In order to avoid these disadvantages, it is known from WO 91/14816 not to apply the longitudinal forces for upsetting along a line which lies transversely to the production direction and in front of which the material is upset and forms creases, but, instead, in discrete introduction zones which lie next to one another in the transverse direction of the web and one behind the other in the direction of run of the web, in each case at a distance from one another, the introduction zones adjacent to one another in the transverse direction being arranged so as to be offset relative to one another in the web running direction. As a result, a sudden linear introduction of the longitudinal forces are exerted as it were in a staggered manner in adjacent width zones of the web. Overall, controlled and finely structured reorientation of the fibres and corresponding product homogeneity, without creases being formed over a large area, are to be achieved thereby.

In this case, the upsetting forces are introduced in the usual way by means of rollers which, however, have relatively small width, a relatively large number of rollers being combined on a common shaft arranged transversely to the web running direction. Shafts adjacent to one another in the running direction rotate at a correspondingly different rotational speed, and shafts with the same roller arrangement, that is to say the rollers of which are in alignment, are moved apart from one another to an extent such that a shaft with corresponding rollers, which, however, are offset in a staggered manner, may be arranged between them. This ensures teat discrete introduction zones are arranged so as to be offset relative to one another over the width of the web.

The introduction zone of each roller on the large face of the web is essentially linear, so that, according to the roller diameter, what is obtained is a distance which is a multiple greater, as compared with the length, measured in the running direction, of the introduction zone of each roller, not only in relation to the rollers located behind it in the direction of alignment, but also in relation to the rollers arranged in between so as to be offset thereto. As a result of the holding-together forces in the composite fibre structure, this narrow linear introduction also results in each roller having a region of action which is greater than the actual contact region, so that these regions of action can overlap one another and lead to a corresponding warping of fibres in the longitudinal and also the transverse direction of the web, thereby counteracting a tendency towards the formation of creases over a large area. These warping forces between the narrow introduction lines lying at a wide distance from one another are nevertheless low; if the acting forces are high, there is the risk that material in the gusset between the rollers will arch upwards and therefore that local distortions and crease formations will occur.

By contrast, the object on which the invention is based is to provide a method and an apparatus, by means of which such high longitudinal forces can be introduced into the web that the material of the mineral wool web is exposed to a fulling action, if appropriate with the fibres simultaneously being upset, warped and felted, so that, if desired, a thin high-density board with correspondingly small air interspaces can be produced.

This object is achieved by means of the present invention.

Consequently, a result of an entirely different quality from that in the generic prior art can be achieved: not primarily reorientation of the fibres such that a large fraction of fibres is aligned in the direction of thickness in the manner of a lamellar or upset board, in order to increase the pressure resistance of the board, but, instead, the fibres are to be intensively felted with one another and warped and also pressed against one another. At the same time, previously horizontal fibres or fibre fragments will also assume a vertical position and thus make a contribution to improving the pressure resistance, but the fulling action occurring in the overlap region of the zones of action leads primarily to felting and compacting reorientation of the fibres or fibre fragments and thus to the consolidation and improvement of the mechanical properties. It is thus possible, if required, to produce a thin board resembling firm cardboard which is resistant to tensile, flexural and upsetting loads in the plane of its large face, that is to say, while having considerable stiffness, neither tears nor easily kinks or bulges, and which, furthermore, because of its small thickness, even without a high fraction of fibres standing vertically, is itself sufficiently pressure-resistant and, after the curing of the binder, has no resilience.

This is achieved by an overlap of introduction zones for the longitudinal forces which are elongated in a sheet-like manner in the longitudinal direction of the web and are arranged so as to be offset next to one another. This overlap region is as it were a departure from the concept of the staggered action of the introduction zones to avoid the formation of creases over a large area and is a return to an active front extending over the entire web width. However, the material, when it impinges on to this active front, is not essentially unguided, contrary to conventional upsetting installations, but, instead, is even guided and held in a virtually sheet-like manner by the trailing introduction zones located next to one another, so that warpings or even crease formations in entire composite fibre structures are nevertheless ruled out. At all events, with small product thicknesses, it is not primarily upsetting of the entering material which takes place in the overlap region, but, instead, horizontal fulling, warping and felting of the material, at the same time with the latter being upset. At the exit of the overlap region, the action of the leading introduction zones ceases, and the material is once again guided cleanly at the introduction zones of the second stage, the felting, warping and compression state achieved in the first overlap region being as it were frozen in and thus being fed, if appropriate, to a second overlap region which has following introduction zones and in which corresponding supplementary further treatment takes place.

In this way, the material can be felted, warped, compressed and fulled as intensively as desired by linking one behind the other a suitable number of introduction zones or rotary members corresponding to overlap regions, the set of introduction zones which in each case follow behind the overlap region maintaining the acquired state until curing commences and fixes this state definitively.

In principle, it is also possible, according to the invention, to treat boards of greater thickness, in order to achieve corresponding fulling, compression and upsetting effects. Where greater product thicknesses are concerned, the effect of acting on the surface in the overlap regions naturally decreases towards the middle of the product. In this middle region, therefore, primarily the upsetting effects increase, but, here too, the formation of creases in entire composite fibre structures over a large area is minimized because longitudinal forces are introduced differently over the width and, at all events, cannot encroach upon that region of the product surface where, even in the case of large product thicknesses, the felting and compacting effects described occur as a result of the mutual warping and fulling of the fibres, so that a surface capable of being subjected to tensile load, along with a correspondingly high flexural resistance in the product, is obtained.

It is particularly preferred, however, if the smallest height of the upsetting channel is smaller than 40 mm, in particular smaller than 25 mm, so as to thus to produce a cardboard-like thin board. In the case of such a thin board or skin, the depth of the zones of action on the mutually opposite large faces of the board reach as far as the opposite large face of the board, so that essentially homogeneous fulling and felting can be achieved. By contrast, in the case of considerably larger board thicknesses, the effects of the introduction zones decrease towards the middle of the board, since fibre regions in the vicinity of the middle of the board are exposed only to a smaller extent to the actions according to the invention, thus yielding a product still specific to the invention and having a so-called "hard skin" on the large surfaces thereof.

A mineral wool board according to the invention may be distinguished by a wavy structure of the fibre alignment on the large faces, such as has occurred due to the fulling or shearing action on adjacent introduction zones in the overlap region. If the board thickness is correspondingly small, this wavy structure may often also be seen even inside the board in sections parallel to the large faces. This wavy structure may also be apparent on the narrow sides.

A mineral wool board produced according to the invention is particularly suitable as an outer skin in a composite mineral wool product according to claim 4, specifically irrespective of the type of treatment of the core or of the main layer of this composite product. If the latter is upset in the usual way, with creases being formed, this outer skin generates corresponding tensile strength in this surface and therefore, overall, high flexural resistance in the board. At all events, in the same way as a hard cardboard layer, the outer skin results in effective surface refinement of the composite product and, for example, gives gripping felt sufficient gripping force as a result of the high upsetting resistance of the said outer skin, makes it possible, on account of its tensile strength, for roof insulating boards to have a walk-on capacity, by virtue of its flexural resistance avoids a visual mattress effect on facade insulating boards and, in the case of industrial ceiling boards, any dishing, and, where plaster base boards are concerned, forms an ideal plaster base layer with ideal evenness. Many of these effects can be achieved even when the hard skin is inside the product as it can be obtained by superposing of a plurality of layer with the hard skin in between.

Figure 2:
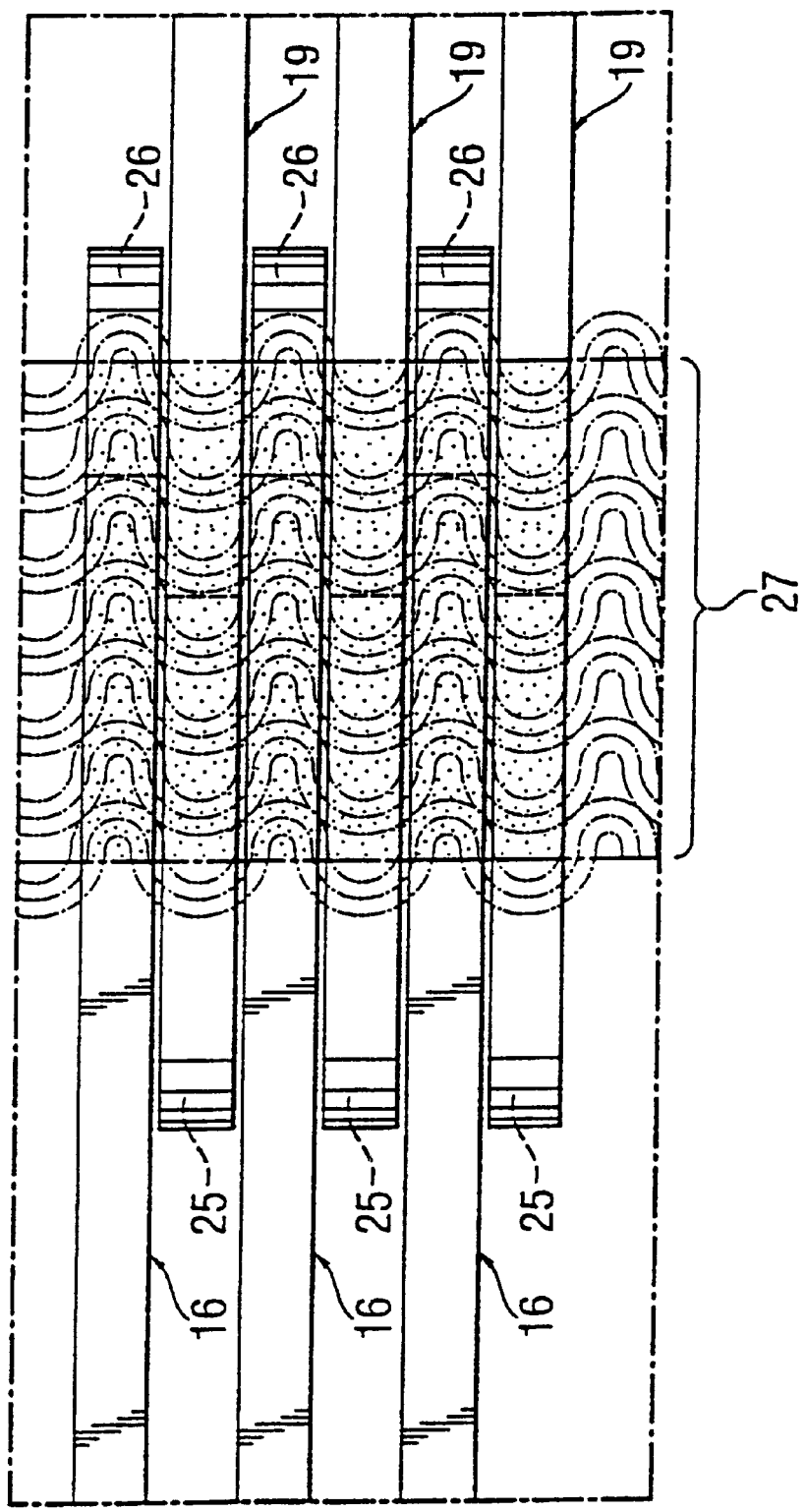
Figure 3:
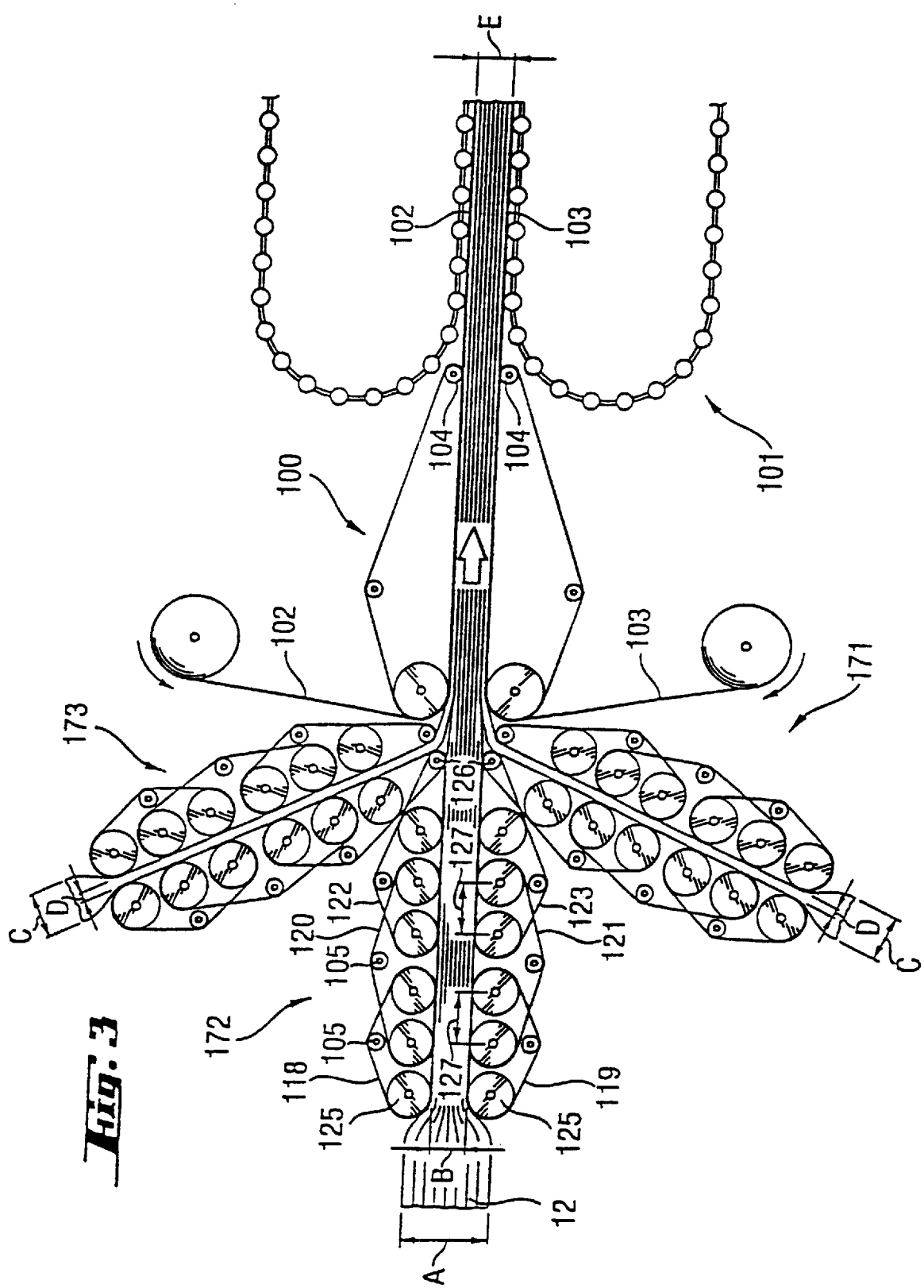

Further details, features and advantages of the invention may be gathered from the following description of exemplary embodiments with reference to the drawing, in which:

FIG. 1 shows a perspective view of an apparatus according to the invention in operation, FIG. 2 shows, in an enlarged plan view on the large surface of a board treated with the apparatus of FIG. 1, an overlap region, and FIG. 3 shows a diagrammatic illustration of an installation according to the invention for producing a multi-layer mineral wool product having base and surface layers each produced by an apparatus of FIG. 1.

In FIGS. 1, 10 and 11 designate a pair of compacting rollers acting on a mineral wool web 17 which is delivered on a production surface 13 designed as a production belt. The mineral wool web 12 has been produced upstream as a fleece in a way known per se by means of defibration assemblies in a conveying direction or running direction according to the arrow 14 and has been deposited on the production surface 13, from where it is pre-compacted between the compacting rollers 10/11 as a raw fleece provided with uncured binder.

Downstream of the compacting rollers 10/11, the mineral wool web passes between two rotary members 15 and 16 in the form of guide belts which prevent the mineral wool web 12 from springing back downstream of the nip of the compacting rollers 10 and 11 and which feed the mineral wool web 12 to an upsetting device 17, as is explained in more detail below.

In the example, the upsetting device 17 consists of three pairs of rotary members 18/19, 20/21 and 22/23 which are linked one behind the other and, in the same way as the rotary members 15/16, are designed as sets of belts which between them form an upsetting channel for the mineral wool web 12. Downstream of the upsetting device 17 in the running direction 14, the present mineral wool web 12 in the form of an upset raw fleece passes in the usual way into a curing device, for example in the form of a tunnel kiln, in which the curing of the binder takes place. Insofar as the entrance of the curing device does not directly adjoin the exit of the upsetting device 17, suitable guide belts or the like may be provided, in order to rule out any springback of the mineral wool web 12 prior to curing.

As is apparent from the drawing, both the rotary members of the upsetting device 17 and the rotary members 15 and 16 are designed as narrow belts which rotate on belt pulleys 24, 25 and 26 arranged at a distance from one another and next to one another on a common shaft, belt pulleys of the same type in the example being provided with identical reference symbols. As is clearly evident from the drawing, in this case, the trailing pulley sets 26 of the rotary members 15/16, 18/19 and 20/21 are arranged downstream of the axes of rotation of the leading belt pulleys 25 of the rotary members 18/19, 20/21 and 22/23 in the running direction 14, so as to give rise in each case to an overlap zone 27, in which in each case the leading belts engage between the set of trailing belts or rotary members, so that, in these overlap regions 27, the mineral wool web 12 is guided both by the set of leading belt-like rotary members 15/16, 18/19 and 20/21 and, at the same time, by the in each case trailing belt-like rotary members 18/19, 20/21 and 22/73. In order to allow such interpenetration of the belts, without the continuous shafts of the belt pulleys 25 and 26 lying on the same axis of rotation colliding with one another, in the example the diameter of the trailing belt pulleys 26 is selected to be considerably smaller than that of the leading belt pulleys 25, so that, in the way which can be seen from FIG. 1, despite the short overall length of the individual rotary members in the running direction 14 the belt pulleys 26 can be arranged between the leading belt pulleys 25, the respective belts being lead through from the trailing belt pulleys 26 in the gaps between the individual belt pulleys 25.

The belt-like rotary members 15/16, 18/19, 20/21 and 22123 each have a small width of only a few centimeters and are arranged at such distances from one another in each set that the belts of the adjacent set can just penetrate through between the gaps, as a result of which the individual belts or rotary members act as intensively as possible on the mineral wool web 12.

If the rotary members 15/16, 18/19, 20/21 and 22/23 were to run at the same speed, a guide channel for the mineral wool web 12 would be obtained, in which the mineral wool web 12 would be picked up in each case by the trailing rotary members before in each case the leading rotary members came out of engagement with the surface of the mineral wool web 12. In order to achieve the desired upsetting effect, however, the trailing rotary members 18/19, 20/21 and 22/23 are in each case driven at a lower speed than the rotary members 15/16, 18/19 and 20/21 arranged upstream of them in the running direction 14. As a result, as is known per se in the art of the upsetting of mineral wool webs, the rotary members exert on the mineral wool web 12 a braking effect which leads to compacting of the material of the mineral wool web 12 and at the same reorientation of the fibres.

An essential feature of the procedure according to the invention is that, in the overlap region 27, the sets of belts or rotary members rotating at different speeds, in spite of their different rotational speed, act simultaneously on the mineral wool web 12 in the width zones corresponding to their respective width. As a result; at least the surface material of the mineral wool web 12, in the longitudinal zones corresponding to the leading belts, is led into the overlap region 27 and through this at undiminished speed, whilst the trailing belts engage into the gaps between the leading belts, the said trailing belts rotating at lower speed and braking the material. This results in a wavy warping of the material of the mineral wool web 12, as indicated by dot-and-dashed lines in FIG. 2. At the same time, the material of the mineral wool web 12 seeks as it were to dip down in the braking longitudinal zones of the overlap region 27, so that, overall, a combined upsetting and felting effect, with the material being compacted at the same time, is obtained due to fulling effects and pressure forces. Particularly where thin material webs 12 are concerned, these effects permeate through the entire thickness of the mineral wool web, so that, after curing, a mechanically firm leaktight skin is obtained, such as is advantageous for many applications.

Due to the to some extent wavy compaction in the overlap region 27, it is thus possible, over and above mere upsetting effects, to take action on the material of the mineral wool web 12 which, particularly in the case of small thicknesses of the mineral wool web 12, leads preferably to fulling, warping and felting effects.

Where larger web thicknesses are concerned, upsetting effects are pre-eminent in the middle region of the mineral wool web 12. However, these do not lead to disturbing crease formations in entire composite fibre structures, since, even if there is creasing in the middle region, surface layers are preserved, which cover the gaps between creases of this kind and thus avoid the adverse decrease in the flexural resistance and in the thermal and acoustic insulating capacity of boards produced in this way and also compensate for this by an increase in the flexural distance due to highly consolidated outer layers.

As shown in FIGS. 1 and 2, overlap regions 27 of this kind may be arranged multiply one behind the other, in order to achieve correspondingly more comprehensive warping, upsetting and fulling effects, the destruction of material from overlap region 27 to overlap region 27 being avoided in that the previously braked longitudinal zones continue to run at unchanged speed in the next overlap region 27, whilst the longitudinal zones which lie between them and through which the overlap region 27 located upstream has previously run are then braked. As a result, the effects described can thus be intensified from stage to stage.

Furthermore, the desired effects may be controlled by a suitable choice of the length of the overlap region 27, as measured in the running direction 14. The longer the overlap region 27 is, the more intensive is the fulling and warping action on the material. Lengths of overlap regions which are suitable in this respect are up to 500 mm, preferably around 150 to 300 mm, in particular of the order of magnitude of 200 mm.

Moreover, the effects may be influenced by the choice of the height of the upsetting channel. In the example illustrated, the upsetting channel is designed with an unchanged height, but it may also be designed to be narrowed or widened, with the result that, in addition to the fulling and warping effects, in particular the upsetting effects and the compaction can also be controlled. Particularly where greater thicknesses of the mineral wool web 12 are concerned, for example a narrowed design of the upsetting channel between the rotary members 15/16, 18/19, 20/21 and 22/73 may be advantageous, e.g. a shape thereof converging in downstream direction.

FIG. 3 illustrates a modified and more complex embodiment of the invention. Here, a mineral wool product with a mainly upset main layer having upper and lower hard skins and with lamination on both sides is produced in one operation.

In the embodiment according to FIG. 3, three upsetting devices 171, 172, 173 of the type according to the invention are provided, and, if desired, are combined with a fourth downstream upsetting device 100 for the overall fleece formed, the said upsetting device 100 being interposed between the exit of the upsetting devices 171, 172 and 173 and the entrance of a curing device, for example in the form of a tunnel kiln, designated by 101. The upsetting device 100 is designed, in the way illustrated, as a pair of braking belts which extends over the entire width of the mineral wool web 12 and at the entrance of which upper and lower laminating films 102 and 103 also run in and are pressed down by the braking belts of the upsetting device 100. The braking belts of the upsetting device 100 are deflected in the region of the entrance of the curing device 101 at deflecting rollers 104 of small diameter, so that the said braking belts can be moved in the way illustrated near to the region of action of the belts of the curing device, in order to avoid any springback of the mineral wool web 12.

The upsetting devices 171, 172 and 173 are modified, as compared with the upsetting device 17 (FIG. 1), and are designed identically to one another, so that a more detailed description of the upsetting device 172 is sufficient. This has three rotary members 1181119, 120/121 and 122/123 which rotate on identical belt pulleys 125 and thus form the upsetting channel. As explained in connection with FIG. 1, each rotary member is designed as a set of narrow belts which are held under tension by tension discs 105 on that side of the belt pulleys 125 which faces away from the mineral fibre web 12. In this case, the belt pulleys 125 for the rotary member 118 are located on both sides of the leading belt pulley 125 of the rotary member 120, the rotary member 118 being held at a distance from these middle belt pulleys 125 by means of the tension discs 105. The rotary member 120 which is in the middle in FIG. 3 spans both the trailing belt pulleys 125 of the rotary member 118 and the leading belt pulleys 125 of the rotary member 122, whilst the rotary member 122 spans the trailing belt pulleys 125 of the middle rotary member 120 and is deflected at trailing belt pulleys 126 of smaller diameter. In the example, trailing belt pulleys 126 of the two upsetting devices 171 and 173 also run on the shaft of the trailing belt pulleys 126 and are arranged at angle of about 60° to the upsetting device 172. In this way, the upper and lower hard skin materials remain guided directly onto the surface of the mineral fibre web 12 by the upsetting devices 171, 173 and can immediately be taken over, together with the mineral fibre web 12, by the upsetting device 100. Of course, the arrangement explained with regard to that side of the upsetting device 172 which is upper in the drawing applies accordingly to its underside.

Thus, in a similar way to the upsetting device 17 of FIG. 1, the upsetting devices 171, 172 and 173 produce overlap regions 127, in which the leading faster rotary members 118/119 and 120/121 engage, at the same time and side on side with the trailing slower rotary members 120/121 and 122/123, on the surfaces of the mineral fibre web 12 and which generate the effects described in connection with FIGS. 1 and 2.

With apparatuses according to the invention being arranged in this way, the most diverse product combinations can be produced, specifically with or without lamination and with or without reinforcing elements, as required. Thus, for example, when the upsetting device 172 is in operation a primarily upset mineral fibre web 12 of comparatively large thickness can be produced. In this case, the raw fleece of the mineral wool web 12, with a thickness A of 200 to 900 mm, preferably 300 to 500 mm, arrives on the production surface 13 not illustrated in FIG. 3 (cf. FIG. 1) and at the entrance of the upsetting device 172 is compressed to a thickness B of 10 to 210 mm, preferably 50 to 150 mm, in particular 70 to 120 mm, and is upset in this thickness and also exposed to additional fulling, felting and compacting actions. The material for the hard skins may arrive with a raw fleece thickness C of 100 to 450 mm, preferably 150 to 300 mm, in particular 200 to 250 mm, and in the upsetting devices 171 and 173 is compressed to a thickness D of 5 to 105 mm, in particular to a thickness of 10 to 50 mm, in particular of 20 to 30 mm, and also, at the same time, subjected to the corresponding fulling, warping and felting and also upsetting and compacting effects.

As already shown by the wide dimensional ranges set out above, any desired products having the most diverse properties can be produced in this way. Thus, for example, if only the upsetting device 172 is in operation a primarily upset product of considerable thickness can be produced, without any creases or the like impairing the mechanical resistance, in particular the flexural resistance; on the contrary, largely homogeneous upsetting with reinforced surfaces is achieved, as already explained in more detail in connection with FIGS. 1 and 2. When the upsetting device 172 is operated simultaneously with the upsetting device 171 or 173, two or three preferably upset mineral fibre webs 12 of approximately the same thickness can be combined, or a consolidated hard skin can be applied by the upsetting device 171 or 173 to a mineral fibre web 12 of comparatively large thickness. Finally, all three upsetting devices 171, 172 and 173 can be used in order to produce any desired product, from the variant, explained in more detail, of a relatively thick middle layer with hard skins on both sides, through the combination of three upset layers of approximately equal thickness, to outer layers of large thickness and a hard skin as a middle layer.

Furthermore, by controlling the speed of the individual rotary members 118 to 123, the intensity of the upsetting, fulling, warping, felting and compacting effects can be set differently on each individual upsetting device 171, 172 and 173. In this case, if required, the same speed of the rotary members may also be selected, so that, instead of upsetting, only a laminar delivery of the mineral wool web 12 is obtained, in order to produce a laminar middle layer or else a laminar outer layer on one side or both sides, if this is the aim intended for the product in the individual instance. An upset hard middle layer between two thicker, if appropriate, laminar outer layers may also be advantageous, for example as a gripping felt.

As shown by the foregoing description, many modifications and variations of the embodiments illustrated are possible, without departing from the scope of the invention. Thus, for example, the interpenetration of the belt sets in order to achieve the overlap regions 27 and 127 may have been brought about in any desired constructive way differently from the embodiments illustrated. It is essential, here, only that the shaft of belt pulleys adjacent to one another in the running direction 14 be located outside the circumference of these belt pulleys. Furthermore, a different design may also be selected instead of belts as rotary members, for example friction rods which are arranged, for example, in a rake-like manner and engage one into the other and which are driven back and forth instead of in a continuous rotational movement.

The following two examples serve to give further details of the invention.

EXAMPLE 1

Starting with a raw fleece 12 having a thickness of 80 mm and a bulk density of 125 kg/m$^3$, a precompacting action was carried out between the compaction rollers 10/11 so as to compact the fleece in vertical direction to about half of its upstream thickness. The pre-compacted fleece subsequently was introduced into an upsetting or grimping apparatus like apparatus 17 of FIG. 1, however with four overlap regions 27, so as to obtain an even symmetry of strip-like longitudinal zones. The gap width between the rotary members was 20 mm corresponding to the product thickness so obtained.

In comparison to a board-like product of mineral wool as obtained by a conventional upsetting or crimping action, the board-like product produced according to the invention had properties as can be seen from Table 1 below.

These measurements were carried out with three test bodies each, and the average values are indicated in Table 1.

The dimension of each test body was 200×200 mm with the thickness of 20 mm as already mentioned.

TABLE 1

|  | Conventional board product | Board product according to the invention | Improvement |
|---|---|---|---|
| Bulk density of raw fleece [kg/m³] | 140 | 125 | — |
| Bulk density of product obtained [kg/m³] | 182 | 145 | −35 |
| Degree of Crimpring | 1:1,3 | 1:1,16 | −1:0,14 |
| Binder Content [wt. - %] | 4.0 | 2,9 | −1.1 |
| Compression tension according to DIN 52272 ("Druck-spannung") | 28 standard requirement >18 | 25 | Within required range |
| Compressibility according to DIN 18165 ("Zusammen-drückung") [mm] | 2.0 standard requirement <3 | 1.5 | +25% |

As can be seen from Table 1, the product obtained according to the invention has not only a reduced bulk density and thus saves raw material, but also saves, compared with a conventional product, binder while obtaining a comparable good compression tension or compression strength. The compressibility of the product obtained according to the invention was even 25% better compared with a conventional product.

EXAMPLE 2

Starting material here was a raw fleece 12 of mineral wool with a thickness of 50 mm and a bulk density of 100 kg/m³. The gap width between the rotary members and thus the thickness of the product was only 10 mmm, and the test bodies usesd as before consequently had sizes of 200×200×10 mm. All other parameters were like in Example 1, and the comparative conventional product was an uncrimped, or not upset, mineral wool board of high bulk density as necessary to obtain comparable strength. A crimped or upset conventional comparative product was not available as at this low thickness of only 10 mm no crimping can be carried out with conventional equipment.

TABLE 2

|  | Conventional board product | Board product according to the invention | Improvement |
|---|---|---|---|
| Bulk density of raw fleece [kg/m³] | 180 | 100 | — |
| Bulk density of product obtained [kg/m³] | 180 | 120 | −60 |
| Degree of Crimpring | Not crimpable in this thickness | 1:1.2 | Possible to produce as crimped product with 10 mm thickness |

TABLE 2-continued

|  | Conventional board product | Board product according to the invention | Improvement |
|---|---|---|---|
| Binder Content [wt. - %] | 4.0 | 2,9 | −1.1 |
| Compression tension according to DIN 52272 ("Druck-spannung") | 7 standard requirement >6 | 8 | Within required range |
| Compressibility according to DIN 18165 ("Zusammen-drückung") [mm] | 1.5 standard requirement <3 | 2.0 | +25% |

As can be seen from Table 2, with the invention it was possible for the first time to produce a crimped or upset board of only 10 mm thickness which may be advantageously combined, especially as so-called hard skin, with further mineral wool layers.

I claim:

1. A method for the production of binder-bound mineral wool products, comprising the steps of:

providing pre-compacted mineral web made up of mineral fibers (12) on a production surface (13);

compacting said mineral web;

providing processing device (17) comprising a plurality of rotary members (15/16) (18/19) (22/22);

grouping said rotary members into a plurality of sets wherein each set is oriented transverse to a direction of travel of said mineral web (14);

arranging said sets whereby some sets precede others in the direction of travel of the mineral web, creating at least one leading set and at least one following set;

further arranging said at least one leading set and at least one following set to engage in at least one gap so that at least one introduction region of a leading set overlaps with at least one introduction region of a following set, thereby creating an overlap region (27)(127) in which both the leading and following sets engage said mineral web (14) simultaneously;

reorienting said mineral fibers of said mineral web (14) by rotating said at least one following set at a lower rotation rate than said at least one leading set.

2. An apparatus for carrying out the method according to claim 1, said apparatus comprising:

a production surface (13) for the depositing of mineral fibres as a mineral wool web (12), a curing device (101) for a binder, and a processing device (17; 171, 172, 173) arranged upstream of the curing device (101), for reorienting the mineral fibres by mechanical action, said processing device having a plurality of rotary members (15/16, 18/19, 20/21, 22/23; 118/119, 120/121, 122/123);

said rotary members grouped into a plurality of sets wherein each set is oriented transverse to a direction of travel of said mineral web (14);

wherein said sets are arranged whereby some sets precede others in the direction of travel of the mineral web, creating at least one leading set and at least one following set;

wherein said at least one leading set and at least one following set are further arranged to engage in at least one gap so that at least one introduction region of a leading set overlaps with at least one introduction region of a following set, thereby creating an overlap region (27) (127) in which both the leading and following sets engage said mineral web (14), simultaneously.

* * * * *